United States Patent [19]

Andrews

[11] Patent Number: 4,475,106
[45] Date of Patent: Oct. 2, 1984

[54] HIGH SENSITIVITY PORTABLE RADIO DIRECTION FINDER

[76] Inventor: George R. Andrews, 9935 Garibaldi Ave., Temple City, Calif. 91780

[21] Appl. No.: 295,627

[22] Filed: Aug. 24, 1981

[51] Int. Cl.³ .............................................. G01S 5/04
[52] U.S. Cl. ................................... 343/435; 343/419; 343/438
[58] Field of Search ............... 343/419, 433, 434, 435, 343/436, 438, 439

[56] References Cited

U.S. PATENT DOCUMENTS 3,725,938  4/1973  Black et al.
3,872,477  3/1975  King.
4,003,060  1/1977  Broce et al.

Primary Examiner—Theodore M. Blum
Attorney, Agent, or Firm—Sellers and Brace

[57] ABSTRACT

A simple inexpensive, very effective high to ultra high frequency radio direction finder is disclosed utilizing two parallel antenna units with switching means for alternately connecting the antenna units to a conventional unmodified FM or NBFM receiver at an audio frequency rate. If the centroids of the antenna units are not on a line normal to the path of the monitored input signal, the amplitude of the audible tone output signal resulting from the difference in phase of the alternately received input signals at the time of switching will vary with the angle of deviation of the antennae from this normal position. The slight alternations of phase are demodulated as slight frequency changes and produce a tone in the FM receiver output having the audio frequency of the antenna switching device. When the line between the electrical centroid of the two antennae is rotated to lie normal to the path of the monitored signal as it passes a point midway between the two antennae, the receiver tone output is a null or minimal, whereas it increases in amplitude as the antenna units are rotated further from normal. The apparatus includes automatic circuitry for resolving the ambiguity of the monitored signal source fore or aft of the operator when the output is at null. This is done by providing a positive indication of which way to rotate the antennae to reach the preferred null, and includes both aural and visual output displays.

6 Claims, 2 Drawing Figures

ALL OP AMPS ARE ELEMENTS OF LM324 QUAD PACKAGES

HIGH SENSITIVITY PORTABLE RADIO DIRECTION FINDER

This invention relates to radio direction finder apparatus, and more particularly to a unique portable device readily carried by the operator or attached to a vehicle, watercraft or the like, and wherein a monitored signal impinging on the two antennae is alternately selected from one antenna or the other at an audio frequency rate and routed to the input of an FM receiver for demodulation to produce either an audible output tone or a visual display indicative of the signal source relative direction. It makes use of relative phase information of the signals delivered by the two antennae, rather than any form of radio signal strength or amplitude information.

BACKGROUND OF THE INVENTION

Many proposals have been made heretofore for radio direction finders useful in the field to enable an operator to determine his own location or to locate the site of a radio transmitter. Illustrative of such prior proposals are to be found in the U.S. Pat. to Leming Jr. et al No. 3,115,635; Rabow No. 3,626,416; Broce No. 4,003,060; Black et al No. 3,725,938; King No. 3,872,477 and Weisser No. 3,813,672. Each of these direction finders and others known to me are subject to numerous shortcomings and disadvantages obviated by my invention. For the most part these prior devices are complex, costly, unwieldy in size and weight and limited in frequency range or range of signal strength. Some are also lacking in adequate provision for resolving the ambiguity as respects the direction location of the signal source right or left of the operator. Although hand-held readily portable direction finders have been proposed heretofore they embody numerous limitations, shortcomings and disadvantages avoided by my invention.

SUMMARY OF THE INVENTION

This invention provides a simple, light-weight, inexpensive, wide frequency coverage, very sensitive, overload proof, hand-held radio direction finder providing non-ambiguous visual and audible outputs. This is achieved using a pair of antenna units spaced less than one wavelength apart rotatable about a common upright axis midway therebetween. The voltages generated in the two antennae by the monitored electro-magnetic signals are alternatively selected at an audio rate and channelled to the input of any conventional unmodified FM radio receiver operating to demodulate the slight phase shift in the source signal if a line between the centroids of the antenna units is not set normal to and transversely of the path of the source signal. If the antenna array is rotated out of this normal position, the FM radio's direction finding tone output signal increases in amplitude with the magnitude of the deviation from the normal position. The invention provides a HF-VHF-UHF direction finder having both aural and visual evaluation facilities useful to aid the operator while rotating the antenna support to obtain a null output from the receiver.

OBJECTS OF THE INVENTION

It is a primary object of invention to provide a simple inexpensive radio direction finder utilizing a conventional unmodified FM or NBFM radio receiver readily carried by the operator or supported in a motor vehicle, boat, plane or at a fixed location.

Another object of the invention is to provide a radio direction finder completely insensitive to signal strength and not subject to overloading by excess signal strength and which functions independently of signal stregth to determine the signal source direction.

Another object of the invention is to provide a radio direction finder usefully employed while the operator is driving a vehicle and the operating results of which can be evaluated without need for the driver-operator taking his eyes off the road.

Another object of the invention is to provide a radio direction finder operable to provide reliable and readily interpreted results even though the monitored signal is very weak.

Another object of the invention is to provide a ratio direction finder having means for displaying an indication of relative signal strength and particularly of signals at or below the total noise level at the receiver output.

Another object of the invention is to provide a radio direction finder operable over a very wide frequency range without need for any adjustment other than tuning the FM receiver. The unit's ability to function with very weak signals aids in this goal by compensating for the loss of efficiency of the dipole antennae as the frequency of operation moves away from the dipole's resonant frequency.

Another object of the invention is the provision of a radio direction finder functioning to average out signal reflections from nearby structures or the like while the finder is movably supported along roadways or the like.

These and other more specific objects will appear upon reading the following specification and claims and upon considering in connection therewith the attached drawing to which they relate.

Referring now to the drawing in which a preferred embodiment of the invention is illustrated:

DESCRIPTION OF THE INVENTION

Figure 1:
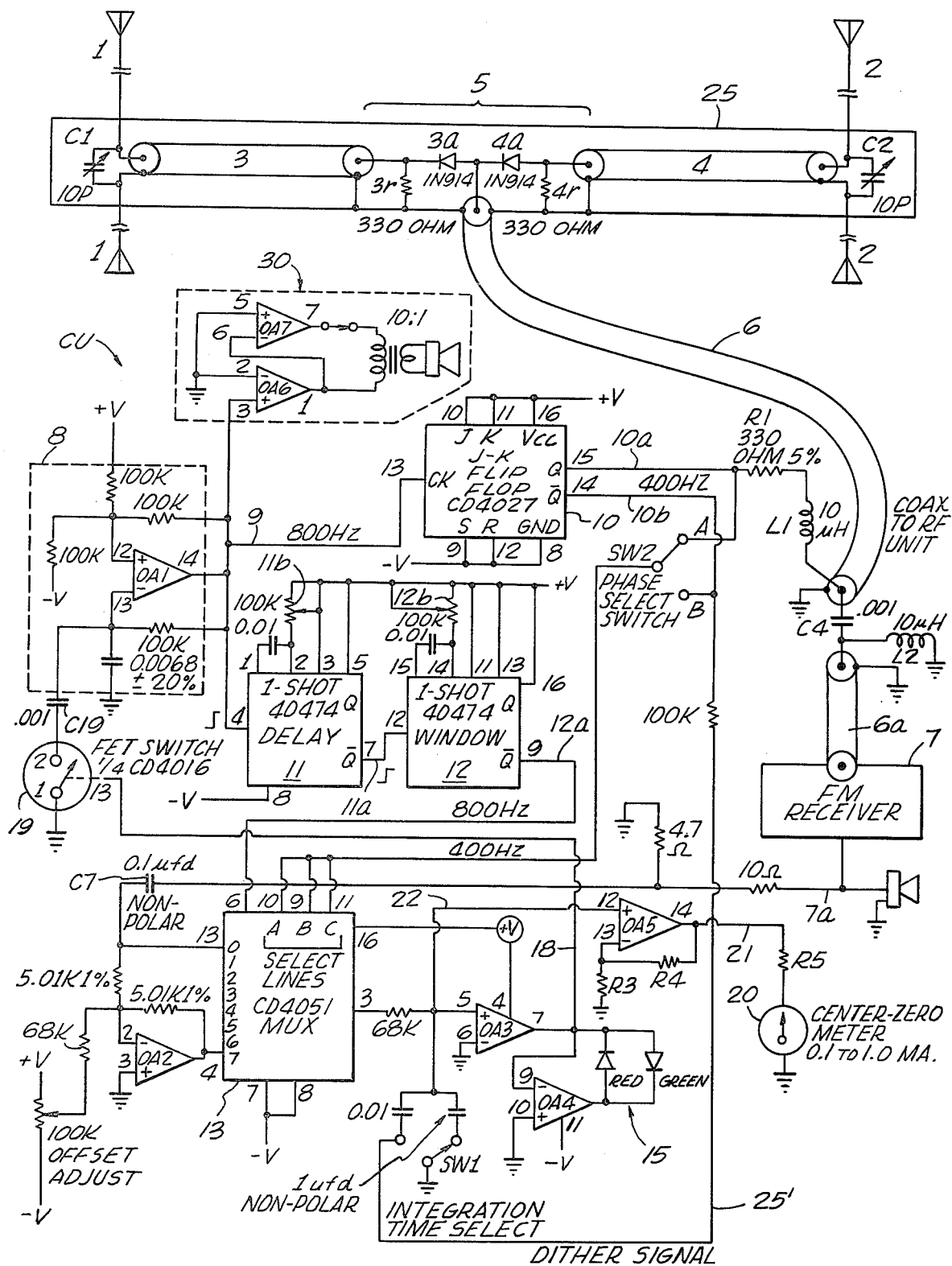
FIG. 1 is a schematic of the invention HF-VHF-UHF direction finder.

Referring to FIG. 1, there is shown a simple inexpensive portable readily hand-carried radio direction finder having an antenna system comprising a pair of parallel antenna units such as the dipole antenna units 1, 2 rigidly supported less than one wave length apart. These antenna units are interconnected by equal length coaxial cables 3 and 4 to a radio frequency switch unit 5 comprising diodes 3a, 4a, connected as shown, and including resistors 3r, 4r connected between the antenna inputs to the diodes and a tubular metal shield 25 embracing the coaxial cables 3 and 4 and providing a rigid support for antenna units 1 and 2. Trimming or equalizing capacitors C1, and C2 connected across the feedpoint of the dipoles function to eliminate slight reactive electrical inequalities thereby assuring the two nulls are 180° apart and normal to the metal shield 25.

The junction of diodes 3a, 4a is connected to the input of a conventional unmodified FM receiver 7 by coaxial cables 6, 6a and a capacitor C4.

Figure 2:
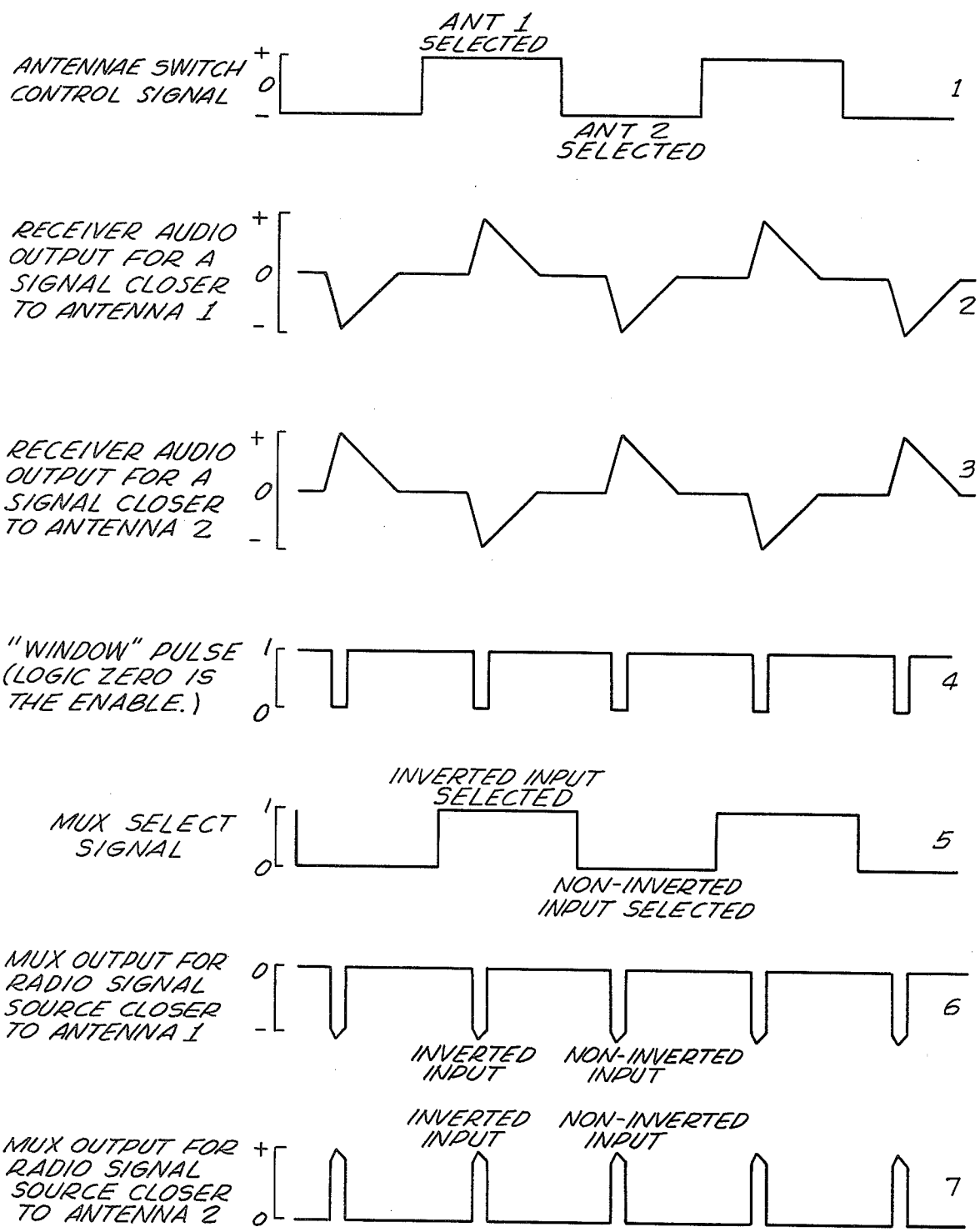
FIG. 2 shows seven slightly idealized waveforms representing conditions described opposite the left hand end of each wave form.

A control unit, designated generally CU, having numerous important functions as will be described presently is connected to cable 6 at its junction with capacitor C4. An understanding of the operation of the direction finder will be aided by a brief description of the seven time-related waveforms shown in FIG. 2.

Waveform 1 represents the control input to the diodes of the antenna switching circuit 5. The positive portion of this signal selects the signal from antenna unit 1 and the negative portion selects the signal from antenna unit 2, the selected signal being passed on to the input of FM Receiver 7.

Waveform 2 represents a typical receiver audio output tone signal when antenna unit 1 is closer to the transmitter being monitored and waveform 3 represents a similar typical audio output signal when antenna unit 2 is closer to the transmitter. Assuming that waveform 5 is controlling the selector input to multiplexer switch unit 13 and waveform 4 as enabling the selected part of the signal to pass through unit 13, then the output of unit 13 is represented by waveform 6. This output signal is composed of parts of the waveform 2 signal and the inversion of that signal with the result that only narrow negative pulses or "slices" of the audio signal are provided for use in resolving ambiguities. Waveform 6 is filtered by the R-C network and delivered to pin 5 of comparator unit OA3. The outputs of both OA3 and OA4 drive the red and green LED network. The direction of current flow from these two operational amplifiers determines which LED will light. In this case the red LED is activated, indicating that the antenna array should be rotated counterclockwise to obtain the preferred null.

If the monitored signal is closer to antenna unit 2, waveform 3 and its inversion will be supplied to detector 13 and the positive pulses of the two signals will be processed to form the waveform 7 signal. After filtering, the signal will drive the comparator input of OA3 positive to activate the green LED thereby indicating that the antenna array should be rotated to the right to obtain the preferred null at the output of receiver 7. This null is of course evidenced audibly by the loudspeaker of receiver 7 as well as by the activation of both the red and green LED's of the visual display device 15. One of the two filter time constants can be selected by switch SW1, the faster time constant being utilized for ordinary work with signals of fair to good signal strength and little multipath contamination, and the slower time constant being utilized for weak and very weak signals or significant multipath contamination.

From the foregoing it will be apparent that the control unit CU functions automatically to resolve the ambiguity as to whether the site of the transmitter being monitored is right or left of the invention monitoring apparatus. This is done by circuitry for comparing the phase of the audio frequency tone signal with the phase of the signal controlling the antenna switching unit 5.

With the foregoing description of typical waveforms in mind the components of the control unit and their functioning will be set forth. The control unit CU is provided with an oscillator unit 8 of any suitable design having an audio frequency output as, for example, 800 Hertz which is delivered by line 9 to pin CK of the JK flip flop unit 10 functioning as a divide-by-2 circuit. The Q and $\overline{Q}$ 400 Hertz output terminals of the flip flop unit 10 provide square waves signals which are routed by lines 10a and 10b to terminals A and B of a phase select switch SW2. Switch SW2 can be used to select the proper phase of the output signal from unit 10 to match the phase of the output signal from receiver 7, it being recognized that the individual receiver in use may have an inverted phase output relative to another receiver. Line 10a, is also connected via current limiting resistor R1 and radio frequency choke L1 to coaxial cable 6 and thence to the switching unit 5. This 400 Hertz signal biases diodes 3a, 4a between their conductive and nonconductive states at the 400 Hertz rate provided at the output of the JK flip flop 10. In this manner the two antenna units are alternatively connected to the input of the FM receiver at an audio frequency rate of 400 Hertz.

The antenna units are mounted for rotation about a vertical bisector in accordance with customary practice well known to those skilled in this art. If the monitored signal source lies on a plane which passes midway between the two antennae and is normal to the metal shield 25 which supports the two antennae units 1 and 2, the two signals transmitted through switching unit 5 to receiver 7 will be in phase. In consequence, the 400 Hertz tone output signal of receiver 7 will be at a minimum or null level. If the antennae metal support tube is not held normal to the path of the source signal, then the alternate signals delivered to the FM receiver 7 from the two antenna units will be out of phase to an extent depending on the angular deviation of the antennae metal shield from the aforesaid normal position providing a minimum or null output from receiver 7. In the event the receiver tone output will be louder as the orientation of the antennae units increases from the null position. However, the operator will not be able to ascertain whether the source signal being monitored is to the left or right of this off-null position. This uncertainty or ambiguity, as it is known by those skilled in this art, is automatically resolved and displayed either visually or audibly as will be explained following a description of other important components.

The 800 Hertz output of oscillator 8 present on line 9 is also delivered to the input of a one-shot multi-vibrator 11 which functions to generate a pulse at each rising edge of the 800 Hertz signal. The width of this pulse is controlled by the adjustment of the 100K potentiometer 11b and the 0.01 mfd capacitor connected to pins 1, 2 and 3 of the one shot unit 11. The $\overline{Q}$ output of unit 11 is delivered via line 11a to multi-vibrator 12 which functions as a window pulse generator the width of which is controlled by the potentiometer 12b and the 0.01 mfd capacitor connected to pins 11, 14 and 15 of unit 12. The 800 Hertz sampling output pulse of unit 12 is conveyed by line 12a to the input pin 6 of multiplexer unit 13. The function and purpose of the sampling pulse entering unit 13 is to allow this unit to pass any incoming signal energy entering unit 13 via either input pin 13 or 4 to output pin 3, but to pass that signal only during the very short period corresponding to the peak of the tone-pulse entering unit 13 via pins 13 or 4 from receiver 7. In the latter connection it will be apparent that the tone-pulses of receiver 7 are delivered to unit 13 by line 7a and the non-polar 0.1 mfd capacitor C7. These tone-pulses enter pin 13 in non-inverted phase and enter pin 4 in inverted phase after passing through inverter OA2.

The adjustable delay function of the one-shot delay unit 11 is employed to accommodate different delay time characteristics exhibited by different FM receivers 7. It is also pointed out that the width of the sampling pulse provided by the one-shot window unit 12 can be adjusted to sample only the crest of the tone-pulse output of receiver 7. Typically this width ranges from 2 to 10% of the time duration of one cycle of the 800 Hertz waveform. By this window sampling technique only the largest part of the tone-pulses are passed on to be filtered. The remaining 90 to 98% of the receiver output are rejected beneficially since they comprise noise energy and modulation imparted to the monitored signal by its transmitter. Hence, this window sampling action may be aptly termed a time domain filter system designed to pass only the peak of the pulses and to reject the remainder.

The result of these major improvements in signal-to-noise ratio combined with the resistor-capacitor integrator network between pin 3 of unit 13 and pin 5 of OA3 allows the direction finder to be operable with very weak and/or noisy output signals from receiver 7.

In addition to the 800 Herz enabling pulse entering MUX unit 13 via pin 6, and the two opposite phase signals derived from receiver 7 as described above, unit 13 also receives a 400 Hertz square wave signal on its select pins 9, 10 and 11. This signal causes unit 13, when enabled, to act as a single pole double throw switch in synchronism with the receiver tone pulse output and the antenna switch 5. When the enable pulse is lacking on pin 6 the equivalent switch provided by unit 13 is totally open thereby allowing no signal to pass. When enabled, unit 13 passes the peak of the tone-pulse. The selection of the signals on pins 4 or 13 of MUX unit 13 is controlled by the 400 Hertz square wave input, functioning, in effect, to invert alternate tone-pulse and leaving the remainder non-inverted as seen at the output of unit 13.

Since the tone-pulse output of receiver 7 is alternately positive and negative, it will be apparent from the foregoing description that the MUX unit 13 functions to provide output signals on its pin 3 of the same polarity, that is either all positive or all negative. These dc pulses, all of the same polarity, are filtered and passed to comparator OA3 which recognizes the signals as either positive or negative and cooperates with inverter OA4 to activate either the red or green LED's 15 thereby to indicate the direction to rotate the antenna array to obtain the preferred null with both LED's activated.

Those skilled in electronic communication technique will recognize that the invention utilizes principles of synchronous transmission and detection. The radio signal modulated by the switching antennae acts as a synchronous "transmitter", the receiver unit 7 is the communications channel which exhibits delay and noise, and the oscillator unit 8 and divider flip-flop unit 10 act as a reference for both the "transmitter" and the detector. Units OA2, 13, the filter network between units 13 and OA3, and OA3 function as a synchronous detector. Unit 11 acts as the synchronism adjusting element by inserting an adjustable delay time between oscillator 8 (the reference itself) and the enable input of the synchronous detector, namely pin 6 of unit 13. This delay compensates for the delay through the receiver 7.

As was pointed out above, switch SW2 can be used to select the proper phase of the output signal from unit 10 to match the phase of the output signal from receiver 7, it being recognized that the individual receiver in use may have an inverted phase output relative to another receiver.

In the absence of a signal to process, that is with the antenna array adjusted close to a null position or no radio signal present at the antennae, it is desirable to provide the operator with a positive indication of the fact. This is accomplished by providing a dither signal that activates both the red and the green LED's. The dither signal is a small 400 Hertz triangular waveform derived from contact B of the phase select switch SW2 and delivered via lead line 25', a 0.01 capacitor and a 100K ohm resistor to input pin 5 of comparator OA3. If there is no output signal from receiver 7 the dither signal so applied to OA3 causes the input on its pin 5 to alternate between + and − thereby forcing the output from OA3 and OA4 to reverse polarity at 400 Hertz with the result that both of the red and green LED's are activated. If the provision for the dither signal is not present only one of the red or green lights would illuminate, thereby falsely indicating that the antenna array should be rotated. Dither is not applied when switch SW1 is selecting the 0.01 ufd filter capacitor. The dither signal has a very small magnitude, and is easily overridden completely by even a rather small input signal. It will therefore be recognized that both LED's 15 are activated by the dither signal only when the antenna array is in the vicinity of its null position relative to the radio signal being monitored or when there is no signal at all.

The polarity of the voltage on the output terminal of comparator OA3 may be used to control the audible tone frequency by the addition or removal of a small capacitor in the oscillator circuit 8. The voltage at the output of OA3 is delivered by lead 18 to an analog switch unit 19 governed by a field effect transistor to provide an effective connection or disconnection of the capacitor C19 between ground and the inverting input of the operational amplifier OA1. When the polarity of the output signal on OA3 changes, the operator can hear the change of frequency in the receiver loudspeaker and determine thereby the proper direction to rotate the antenna array. For example, the higher audible tone frequency indicates that the antennae array should be rotated clockwise, and vice versa.

This frequency change occurs over a narrow angular displacement of the antenna array closely adjacent either side of the null position and coincident with the range within which both LED's are energized.

If the signal is too weak to be audible at the output of receiver 7 the slightly varying frequency change present on output line 9 of oscillator 8 can be monitored on a separate speaker circuit designated generally 30. This circuit includes OA6, OA7, an impedance matching transformer, a speaker mute switch and a speaker. The tone output of this speaker is nominally 800 Hertz output of oscillator 8. Additionally the amplitude does not change in response to antennae rotation as it does at the receiver output.

This tone frequency shift mode of operation is particularly useful when the equipment is being used on a moving vehicle and experiencing varying multi-path signals caused by reflections from nearby objects. Such reflections are virtually impossible to evaluate aurally but are readily averaged out by the circuitry and indicated visually both by meter 20 and by the LED's and audibly by the tone frequency change on the loudspeakers. This tone frequency shift characteristic enables the vehicle operator to rotate the antenna to obtain a bearing without taking his eyes off the road.

A third method of determining which way to rotate the antennae array in order to reach the preferred null position is provided by a visually observable zero center meter 20 and the cooperating auxilliaries in circuit therewith. As shown in FIG. 1, meter 20 is connected in circuit with a resistor and a lead 21 to the output terminal of an operational amplifier OA5. The inverting input terminal of this unit is resistively grounded and its noninverting input is connected by conductor 22 to the input terminal of comparator OA3. It will therefore be recognized that the left or right needle deflection of meter 20 from its center position functions as an ancillary visible indication of the direction to rotate the antennae array to achieve the preferred null position of the antennae.

Additionally the deflection of the meter needle may be utilized to determine relative strength of very weak monitored signals including, in particular, ratio signals at and below the total noise level. Such signal strength is measured with the antenna unit's metal tube 25 positioned to lie in the path of the intercepted signals, that is, at 90° to the null position.

Some FM receivers will provide output signal wave forms 2 and 3 which are inverted from those shown. This is readily corrected by shifting switch SW2 to use the inverted wave output of flip flop unit 10. This will correct the otherwise incorrect phase comparison between the receiver output and the antenna switching signal.

A 10 μH radio frequency choke L2 functions to prevent switching signals from being conducted to the receiver along the coax cable 6A since some FM receivers cannot tolerate the switching signal on their antennae input.

The resistive divider networks connected to the receiver output and having the designated values of 4.7 ohms and 10 ohms prevent excess signal strength reaching unit 13 and OA2. This network avoids the risk of overdriving OA2 and unit 13. Such overdrive can cause erratic or erroneous displays when monitoring a very weak and therefore noisy source signal.

In conclusion, it will be understood that the power supply for the control unit has its positive and negative output lines balanced to within five percent voltagewise with reference to ground. These outputs include 2,000 microfarad or more filter capacitors to ground. The voltages are nominally + and −4.5 volts, but can range from ±3 to ±7 volts.

While the particular high sensitivity portable radio direction finder herein shown and disclosed in detail is fully capable of attaining the objectives and providing the advantages hereinbefore stated, it is to be understood that it is merely illustrative of the presently preferred embodiment of the invention and that no limitations are intended to the detail of construction or design herein shown other than as defined in the appended claims.

I claim:

1. Radio direction finding apparatus for determining the arrival direction of electromagnetic waves from a remote transmitter, said apparatus being of the type having a pair of parallel antennae spaced apart less than one wavelength and coupled by an audio rate selector switch into the input of a conventional FM receiver effective to provide an audible output signal having a tone null incident to positioning said antennae so that a line therebetween is normal to and transversely of said direction of wave propagation from said remote transmitter undergoing monitoring and wherein said apparatus includes means for synchronously detecting the output of said FM receiver, said apparatus being characterized by the provision of:

means for sampling a narrow portion of said FM receiver output corresponding to the peak of the frequency modulation pulse impressed by the operation of said selector switch on the monitored signal thereby to enhance the effective signal-to-noise ratio characteristic of the direction finding signal contained in the output of said FM receiver;

means for filtering said sampled signal; and means for determining the polarity of said filtered sampled signal thereby to indicate the direction to rotate said antennae to obtain the preferred null position.

2. Radio direction finding apparatus as defined in claim 1 characterized in that said polarity determining means includes visual display means operable to indicate the direction to rotate said antenna to obtain the preferred null position.

3. Radio direction finding apparatus as defined in claim 2 characterized in that said polarity determining means includes left and right display means, and means operable to activate each thereof simultaneously if there is virtually no direction finding output from said FM receiver thereby indicating that said antennae are in a null position.

4. Radio direction finding apparatus as defined in claim 1 characterized in that said polarity determining means includes aural means operable to provide an indication of the direction to rotate said antennae to achieve the preferred null position thereof.

5. Radio direction finding apparatus as defined in claim 4 characterized in that said polarity determining means includes means operable to provide an audible change in the frequency of the direction finder tone contained in the output signal of said FM receiver as said antennae are rotated through the null position while monitoring a signal from said remote transmitter.

6. Radio direction finding apparatus ad defined in claim 4 characterized in that said aural means includes constant amplitude means operable independently of the audible output of said FM receiver and providing distinctive audible tones respectively indicative of the direction to rotate said antennae to achieve the preferred null of said monitored transmitter.

* * * * *